United States Patent [19]

Yamasaki

[11] Patent Number: 4,870,441

[45] Date of Patent: Sep. 26, 1989

[54] PHOTOELECTRIC CONVERSION APPARATUS FOR FOCUS DETECTION

[75] Inventor: Masafumi Yamasaki, Hachioji, Japan

[73] Assignee: Olympus Optical Company Limited, Japan

[21] Appl. No.: 166,996

[22] Filed: Mar. 11, 1988

[30] Foreign Application Priority Data

Apr. 1, 1987 [JP] Japan ................................. 62-80275

[51] Int. Cl.$^4$ .............................................. G03B 3/00
[52] U.S. Cl. ..................................... 354/402; 250/201; 250/578
[58] Field of Search ............................... 354/402–409; 358/213.19; 250/201 R, 201 AF, 201 PF, 204, 578

[56] References Cited

U.S. PATENT DOCUMENTS 4,550,993  11/1985  Taniguchi et al. ................... 354/402

FOREIGN PATENT DOCUMENTS 57-64711  4/1982  Japan .

*Primary Examiner*—W. B. Perkey
*Attorney, Agent, or Firm*—Louis Weinstein

[57] ABSTRACT

A photoelectric conversion apparatus for focus detection includes a monitor photoelectric transducer element which produces a voltage corresponding to a charge storage produced by photoelectric transducer elements in accordance with a distribution of light brightness of an object being photographed. An output voltage from the monitor transducer element is compared against a reference voltage at a given time interval after the initiation of the charge storage. If a result of the comparison indicates that an output voltage from the monitor transducer element reaches the reference voltage, the output from the photoelectric transducer elements is directly used in the focus detection. When the output of the monitor transducer element does not reach the reference voltage, the output from the photoelectric transducer element is fed to an amplifier after the time interval, and an output from the amplifier is used in the focus detection.

23 Claims, 10 Drawing Sheets

PHOTOELECTRIC CONVERSION APPARATUS FOR FOCUS DETECTION

FIELD OF THE INVENTION AND RELATED ART STATEMENT

The invention relates to a photoelectric conversion apparatus for focus detection, and more particularly, to a photoelectric conversion apparatus which may be used in a focus detector of a photographic camera or the like to derive a signal representing an in-focus condition based on the distribution of optical brightness on photoelectric transducer elements.

A problem concerned with a photoelectric transducer element relates to a range of brightness which it can cover. Considering its use in a normal manner, a photographic camera may be used in the gloom at one time or may be used in a bright place such as on the beach in summer at another. To provide a maximum possible coverage over such varying environment, a technique has been employed in the prior art which changes the storage time of photoelectrical charge of the transducer element. By way of example, Japanese Laid-Open patent application No. 64,711/1982 discloses a focus detector in which a monitoring photoelectric transducer is disposed adjacent to an array of photoelectric transducer elements to store an electric charge until it reaches a given value, whereupon the storage of the charge is terminated. The minimum value of the charge storage time is determined by response lags of an associated circuit or elements and is usually on the order of several tens of microseconds while the maximum value is determined by a limit on the lag which prevents an interference with the detection of an in-focus condition and is usually on the order of a hundred milliseconds. Accordingly, a dynamic range covers only about 13 steps. In practical use, a range covering 17 to 18 steps is required if one desires to take a picture under candlelight as well as an object in sunny summer light.

The present applicant has previously proposed an arrangement (see Japanese Patent Application No. 34,055/1981) in which a light shielding member such as a liquid crystal which is capable of adjusting the light transmission depending on the brightness of an object being photographed is disposed in an optical path which is incident on a photoelectric transducer used for purpose of detecting an in-focus condition so that the amount of incident light is reduced when the object is under bright illumination to derive a charge storage time which is free from any error due to a response lag of an associated circuit or photoelectric transducer elements.

According to the conventional art, if it is desired to achieve a rapid response in darkness when the dynamic range of brightness is reduced, there results a too fast response in brightness, causing a reduced dynamic range in brightness due to the limiting response speed of an associated circuit or photoelectric transducer elements. Conversely, if the circuit arrangement is adjusted to provide a proper response under bright illumination, there results a retarded response in darkness, causing a reduced dynamic range in darkness due to a lag in detecting the in-focus condition. The disposition of a light shielding member such as a liquid crystal which enables a change in the transmission in the optical path results in an increased size of a focus detector and an increased cost thereof. It is also unfavorable because of delicate influences upon the optical characteristics such as aberrations, color temperature or the like.

On the other hand, the performance of a CCD (charge coupled device) image sensor has been improved drastically, enabling an amplification of an output from such conversion device without substantially degrading the S/N ratio by integrating such device and an amplifier circuit into one chip.

SUMMARY OF THE INVENTION

It is an object of the invention to provide a photoelectric conversion apparatus for focus detection which increases a dynamic range of brightness subject to photometry, by comparing an output from a monitor photoelectric transducer which develops a voltage corresponding to an output from a photoelectric transducer element against a reference voltage and amplifying the output from the photoelectric transducer element in accordance with the result of such comparison.

In accordance with the invention, the output is amplified to a greater degree under a reduced brightness to extend the range in which the photometry is enabled than for the amplification which is applied under a high brightness. In this manner, the response speed under the high brightness can be retarded more effectively than the limiting response speed of an interface or elements, thus increasing the breadth of the brightness range which is subject to photometry and enabling the detection of an in-focus condition with a higher accuracy.

DETAILED DESCRIPTION OF PREFERRED EMBODIMENTS

Figure 2:
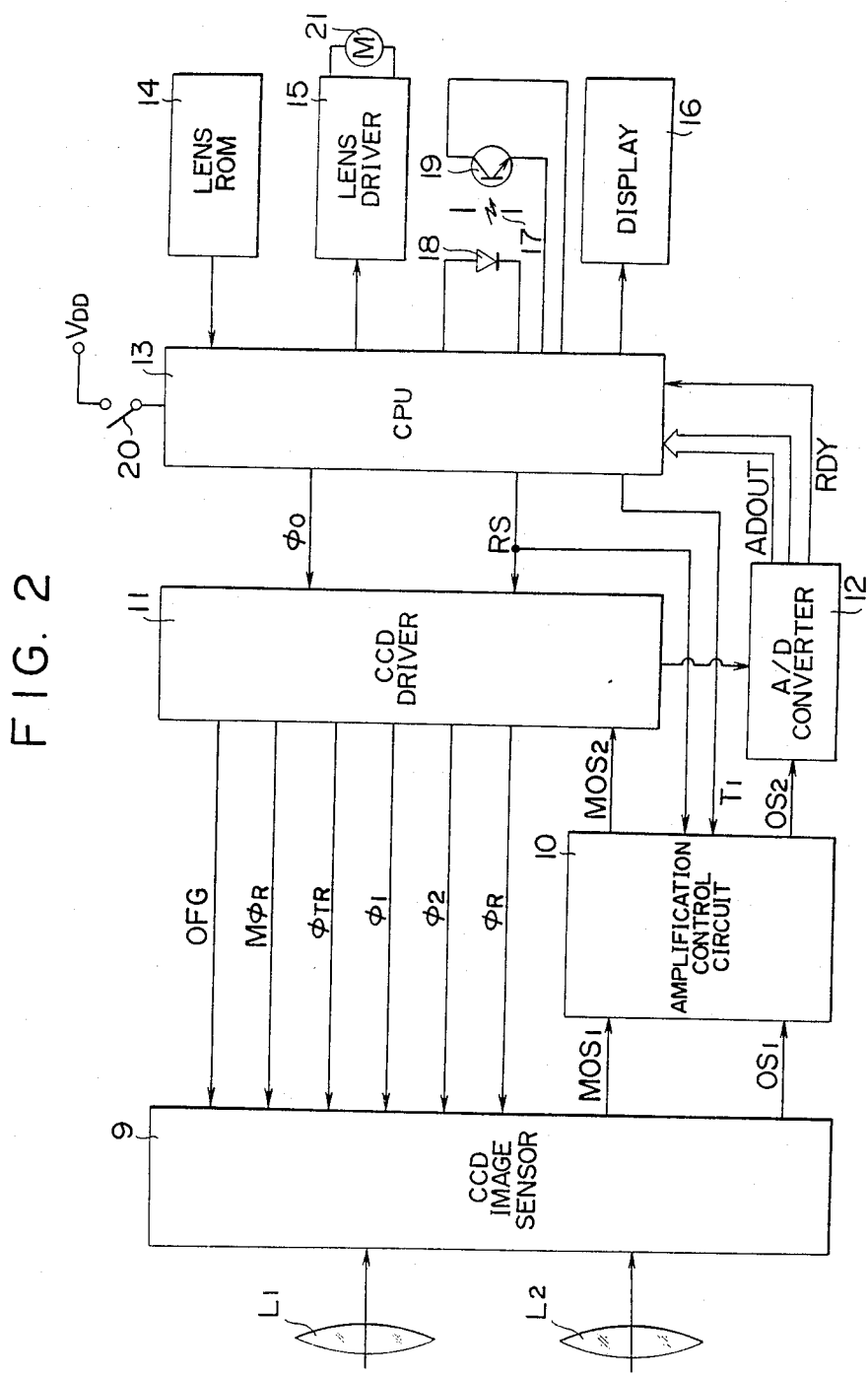
FIG. 2 is a block diagram of an entire focus detector which incorporates the conversion apparatus of the invention.

Initially referring to FIG. 2, there is shown a block diagram of an entire focus detector which incorporates a photoelectric conversion apparatus according to the invention. In this Figure, a ray of light which transmits through a pair of lenses $L_1$, $L_2$, which are required to perform the detection of an in-focus condition, is incident on a CCD image sensor 9. In response to the closure of a start switch 20, a microprocessor (CPU) 13 begins to operate, feeding a reference clock pulse $\phi_0$ which is a priming signal to drive the sensor 9 and a reset signal RS to a CCD driver 11 for resetting it prior to the storage of a charge. CPU 13 also feeds the reset signal RS and a timing signal $T_1$, which is used in switching the amplification factor, to an amplification control circuit 10. The driver 11 feeds an overflow gate signal OFG, a monitor reset signal $M\phi_R$, a transfer pulse $\phi_{TR}$, transfer clock pulses $\phi_1$, $\phi_2$ for a CCD shift register and a reset pulse $\phi_R$ to the sensor 9, the reset pulse $\phi_R$ periodically resetting a floating diffusion of the output stage of the CCD shift register. The sensor 9 feeds an output signal $OS_1$ and a monitor output signal $MOS_1$ to the amplification control circuit 10. The control circuit 10 feeds a signal $MOS_2$ which is in the form of a pulse having a time duration proportional to the charge storage time to the driver 11. The control circuit 10 amplifies the output signal $OS_1$ from the shift register to provide a signal $OS_2$, which is fed to an A/D converter 12. The driver 11 provides a timing signal for the A/D conversion to the converter 12. The converter 12 delivers a digitized version ADOUT of the output signal $OS_2$ from the control circuit 10 and a signal RDY representing the completion of the A/D conversion by the converter 12 to CPU 13.

A lens drive circuit 15 operates to drive a taking lens by rotating a motor 21 in accordance with information indicative of the distance to an object being photographed which is calculated by CPU 13. A lens ROM 14 is a read only memory which is housed within the lens barrel, storing data such as the F-number of the lens, a conversion coefficient for deriving a defocus distance from a displacement of an image or the like which are required to perform the detection of an in-focus condition. A display 16 indicates whether the arrangement is in focus or out of focus. Normally, the distance to an object being photographed is detected, and a taking lens is driven in accordance with such information. It is necessary that the movement of the lens be fed back to CPU 13, but it is a common practice to substitute the number of revolutions of the lens drive motor 21 for such movement of the lens. To this end, the combination of a light emitting diode 18 and a phototransistor 19 is provided. Specifically, slits 17 are formed at equal entervals in a rotatable member of the lens drive circuit 15 is operative to rotate the motor 21, these slits 17 also rotate, whereby a photo-interrupter comprising the diode 18 and the phototransistor 19 disposed on the opposite sides of the path of these slits is able to count the number of slits 17 which have passed therebetween. CPU 13 stores the number of slits 17 counted in a memory until a given value is reached, whereupon it ceases the rotation of the motor 21.

Figure 3:
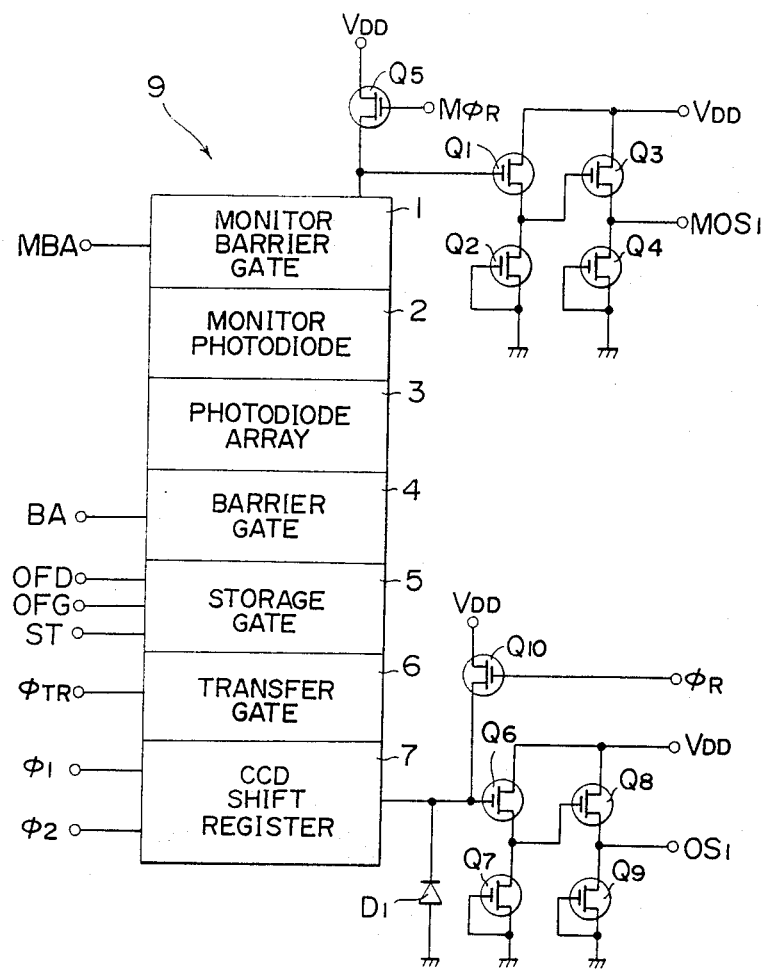
FIG. 3 is a schematic illustration of a CCD image sensor used in the focus detector of FIG. 2.

FIG. 3 shows the arrangement of the CCD image sensor 9 used in the focus detector. A monitor photodiode 2 is effective to control the storage time of a signal charge which is developed by a photodiode array 3, and an electric charge in excess of a potential applied to a monitor barrier gate 1 is stored in a diffusion layer of the gate of a field effect transistor (hereafter abbreviated as FET) $Q_1$. FET's $Q_1$ to $Q_4$ form a two-stage amplifier of a source follower configuration, a source output from FET $Q_3$ providing the monitor output signal $MOS_1$. It is to be understood the FET's $Q_1$ to $Q_{10}$ are all MOS transistors of n-channel type. FET $Q_5$ is effective to reset the stored charge in the monitor photodiode 2 to a drain voltage $V_{DD}$ of FET $Q_5$ prior to the initiation of the storage. The monitor reset signal $M\phi_R$ applied to FET $Q_5$ as well as the overflow gate signal OFG are controlled by CPU 13. The array 3 comprises a linear array of 128 photoelectric transducer elements, for example. Each transducer element represents a picture element, and an electric charge which is developed by such element in proportion to the intensity of incident light thereon which is in excess of the potential applied to the barrier gate 4 is stored in a storage gate 5. When the amount of charge developed by the monitor photodiode 2 reaches a given level, a transfer gate 6 is opened to transfer the signal charge to a CCD shift register 7. A diode $D_1$ is connected to a transfer output terminal of the shift register 7 to provide a floating diffusion output. FET $Q_{10}$ is operative to reset the floating diffusion periodically, and is controlled by the output signal $\phi_R$ from the CCD driver 11. FET's $Q_9$ to $Q_7$ form a two-stage amplifier of source follower configuration, the source of FET $Q_8$ providing a signal charge $OS_1$ for each picture element as an output. In FIG. 3, MBA represents a signal controlling the monitor barrier gate 1, BA a signal controlling the barrier gate 4, OFD a signal controlling the overflow drain below the storage gate 5, OFG the overflow gate signal, ST a signal controlling the storage gate 5, $\phi_{TR}$ the transfer pulse controlling the transfer gate 6, and $\phi_1$ and $\phi_2$ the transfer clock pulses applied to the CCD shift register 7.

Figure 1:
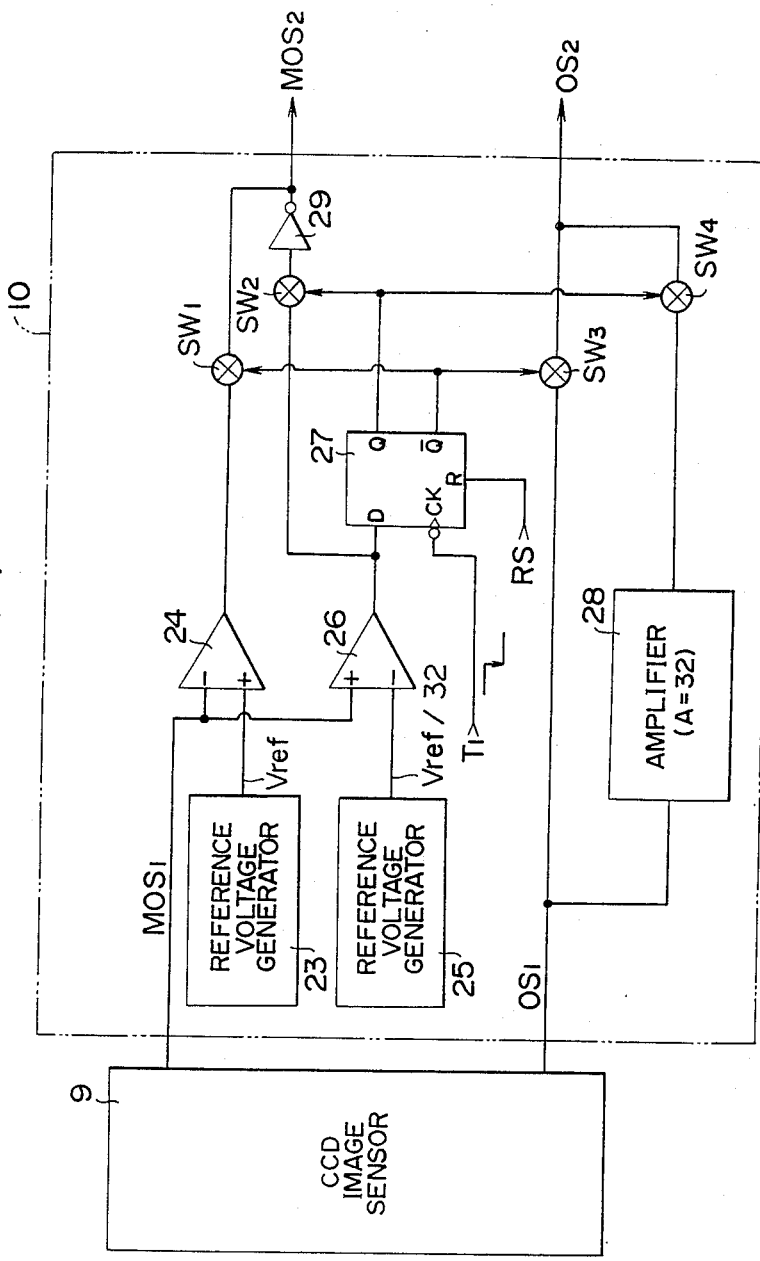
FIG. 1 is a circuit diagram of a photoelectric conversion apparatus for focus detection according to one embodiment of the invention.

Referring now to FIG. 1, the amplification control circuit 10 used in the focus detector will now be described. The monitor output signal $MOS_1$ from the CCD image sensor 9 is applied to the inverting input terminal of a comparator 24 and to the non-inverting input terminal of a comparator 26. A reference voltage Vref of a given level which is produced by a reference voltage generator 23 is fed to the non-inverting input terminal of the comparator 24 while another reference voltage Vref/32 of a given level which is produced by a reference voltage generator 25 is applied to the inverting input terminal of the comparator 26. The output terminal of the comparator 24 is connected to an input terminal of an analog switch $SW_1$ while the output terminal of the comparator 26 is connected to D-input terminal of a D-type flipflop (hereafter abbreviated as F/F) and to an input terminal of an analog switch $SW_2$. The output terminal of the analog switch $SW_2$ is connected to an input terminal of an inverter 29, and the output terminal of the analog switch $SW_1$ is connected to the output terminal of the inverter 29. An output from the inverter 29 is delivered to the CCD driver 11 (see FIG. 2) as the signal $MOS_2$. The timing signal $T_1$ from CPU 13 is applied to CK (clock) input terminal of the F/F circuit 27. The timing signal $T_1$ normally assumes its "H" level, and changes to its "L" level 3.125 ms after the initiation of the charge storage by the CCD image sensor 9. The F/F circuit 27 holds the level which prevails at the D-input terminal at the time when the timing signal $T_1$ changes from its positive to its negative level, thus delivering it from its Q output terminal. Q-output from the F/F circuit 27 provides a control signal for the analog switch $SW_2$ and analog switch $SW_4$ which will be described later. $\overline{Q}$ output from F/F circuit 27 provides a control signal for the analog switch $SW_1$ and an analog switch $SW_3$ which will be described later. These analog switches $SW_1$ to $SW_4$ are turned on when a control signal applied thereto assumes its "H" level, and are turned off when the control signal assumes its "L" level. The output signal $OS_1$ from the shift register 7 is fed to the input terminal of the analog switch $SW_3$ and to the input terminal of the amplifier 28. The amplifier 28 has an amplification factor A which is equal to 32. The output terminal of the amplifier 28 is connected to the input terminal of the analog switch SW$_4$. The output terminals of the analog switches SW$_3$ and SW$_4$ are connected together, whereby the output signal OS$_1$ from the shift register 7 passing through the analog switch SW$_3$ or the output from the amplifier 28 which has passed through the analog switch SW$_4$ can be derived as the signal OS$_2$. The signal OS$_2$ is an analog signal which is delivered to the A/D converter 12 (see FIG. 2) for conversion into a digital value.

Figure 4:
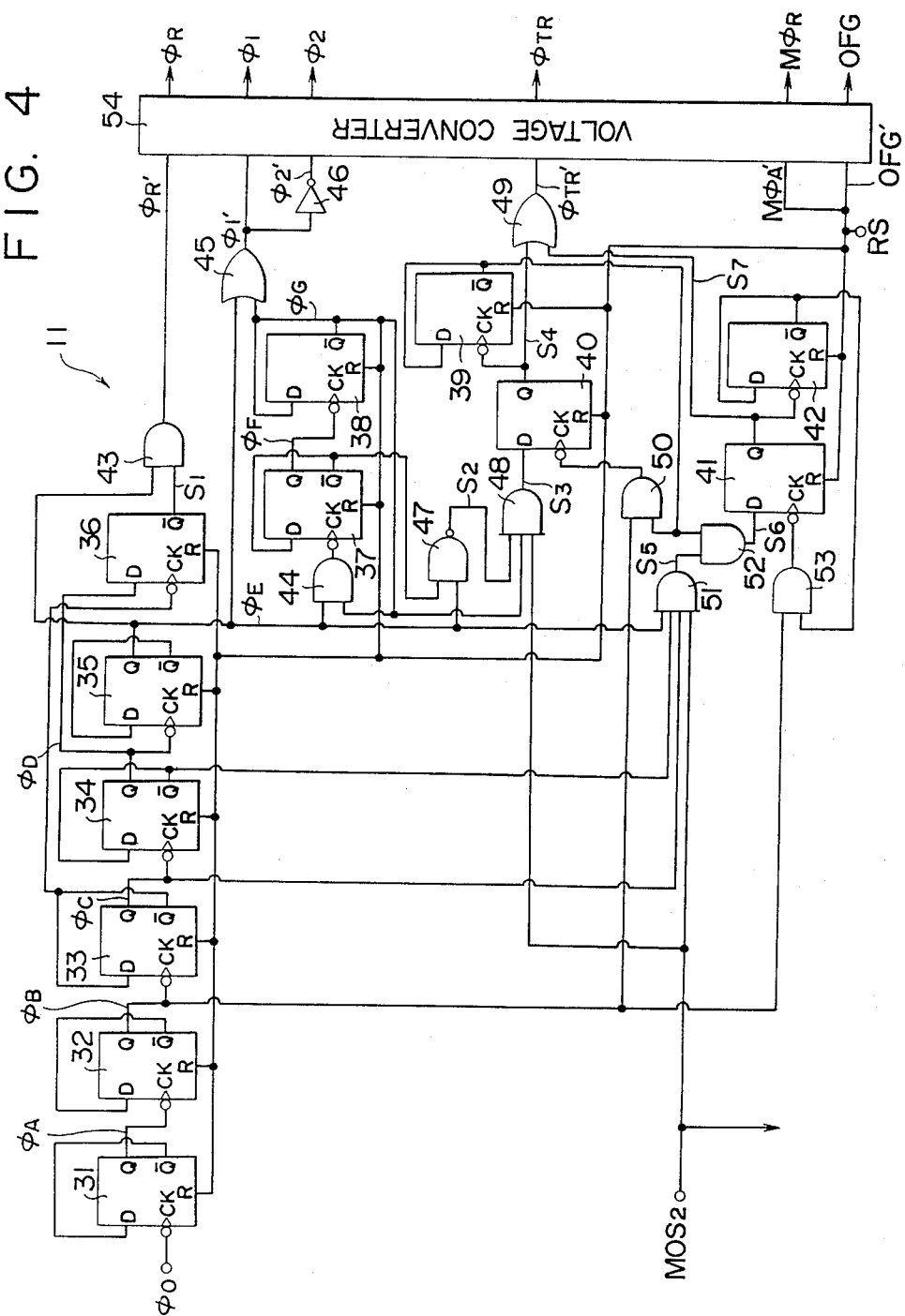
FIG. 4 is a circuit diagram of CCD driver used in the focus detector of FIG. 2.
Figure 6:
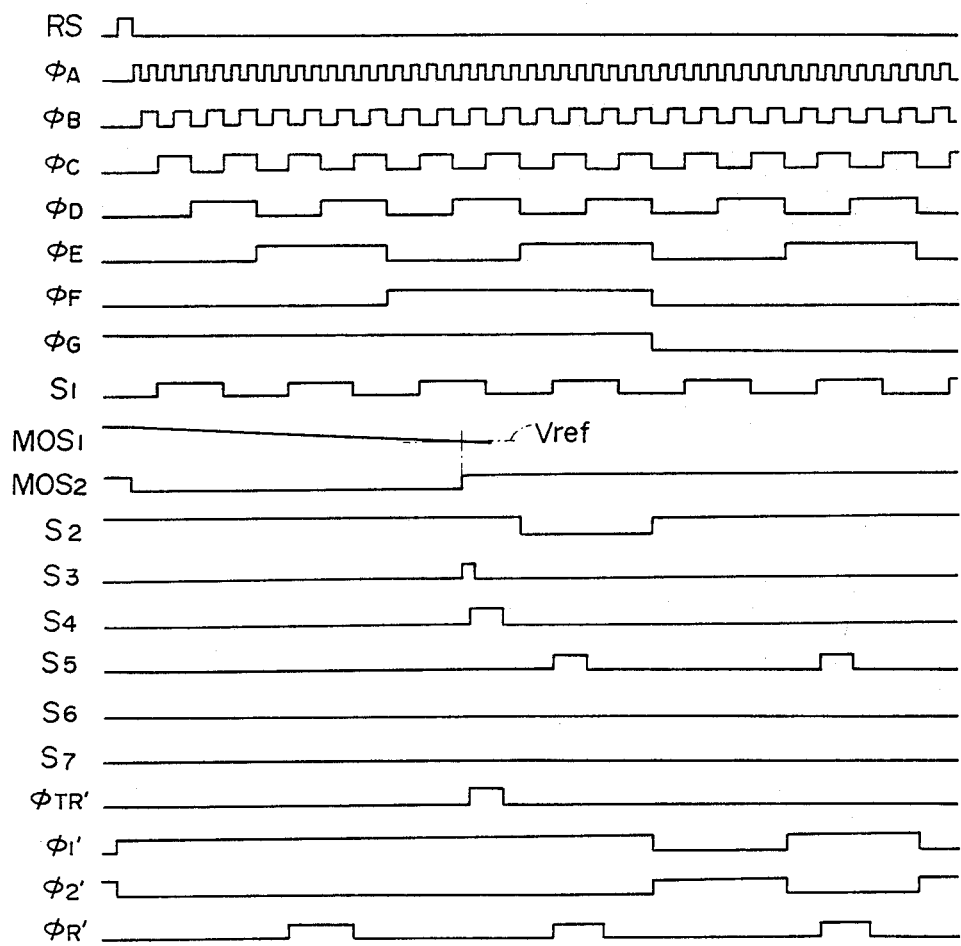
FIGS. 6 and 7 graphically show a series of waveforms of various signals appearing in the focus detector shown in FIG. 2 for illustrating the operation thereof.
Figure 7:
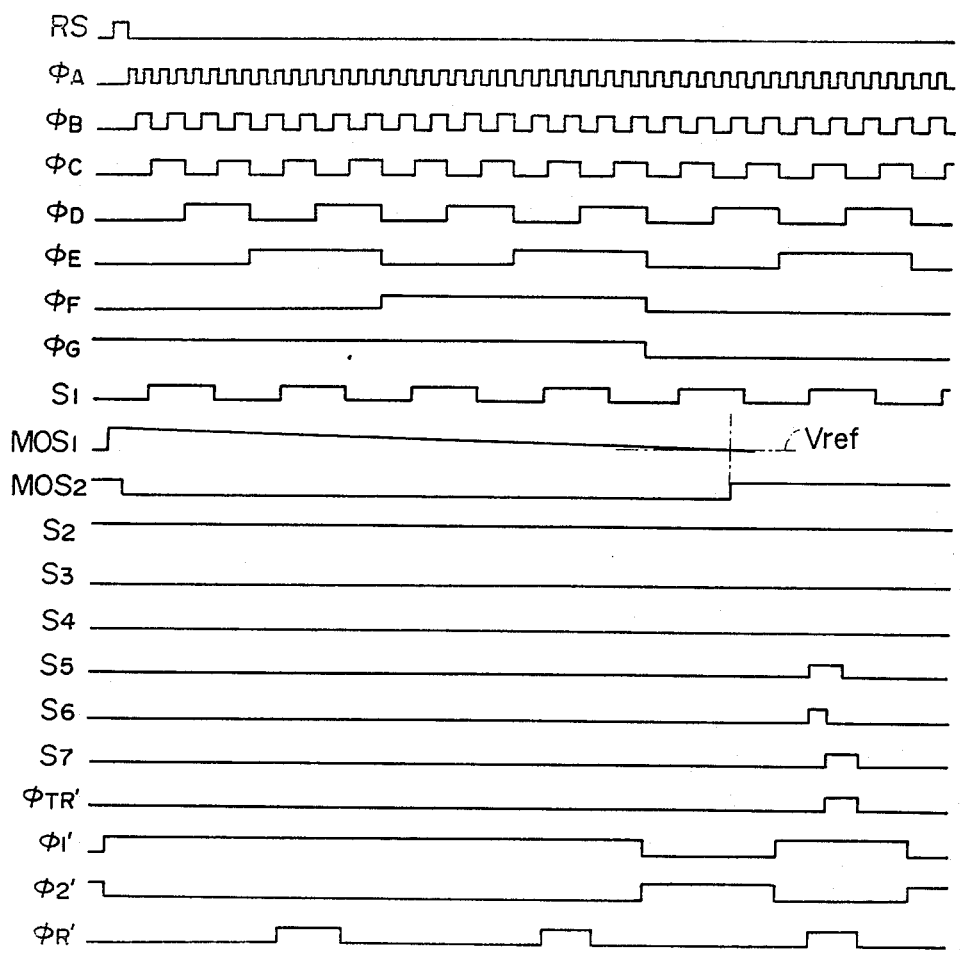

FIG. 4 shows a circuit diagram of the CCD driver 11 used in the focus detector. The waveforms of various signals which appear in the driver 11 during its operation are illustrated in FIGS. 6 and 7. Referring to FIG. 4, a plurality of F/F circuits 31 to 35 sequentially divide the frequency of the reference clock pulse $\phi_0$ from CPU 13, thus delivering signals $\phi_A$ to $\phi_E$ from their respective Q output terminals. AND gate 43 forms a logical product of the output signal $\phi_E$ from the F/F circuit 35 and the signal S$_1$ from $\overline{Q}$ output terminal of F/F circuit 36, and provides an output $\phi_R'$ which is delivered to a voltage converter 54. The voltage converter 54 delivers the pulse $\phi_R$ to the CCD image sensor 9 for periodically resetting the floating diffusion. The signal $\phi_E$ is fed through OR gate 45 to the voltage converter 54 as a signal $\phi_1'$. The signal $\phi_1'$ is also inverted by an inverter 46 to provide a signal $\phi_2'$, which is also fed to the voltage converter 54. The signals $\phi_1'$ and $\phi_2'$ are converted into suitable levels by the converter 54 to provide the transfer clock pulses $\phi_1$ and $\phi_2$. A circuit portion comprising the gate 44 and F/F circuits 37, 38 is effective to maintain the transfer clock pulse $\phi_1$ at its "H" level and the transfer clock pulse $\phi_2$ at its "L" level for a given time interval after F/F circuits 31 to 42 are all reset by the reset signal RS. One input of the gate 44 is fed with the signal $\phi_E$ from F/F circuit 35 while the other input is fed with a signal $\phi_G$ from $\overline{Q}$ output terminal of F/F circuit 38. The output terminal of the gate 44 is connected to CK input terminal of F/F circuit 37. F/F circuits 37 and 38 sequentially divide the frequency of an output from the gate 44, thus forming a frequency divider which delivers the signals $\phi_F$, $\phi_G$. The signal $\phi_G$, which is $\overline{Q}$ output from F/F circuit 38, is fed to the other input of OR gate 45, thus providing the signals $\phi_1'$, $\phi_2'$.

A combination of NAND gate 47, AND gates 48, 50 to 53, F/F circuits 39 to 42 and OR gate 49 is effective to deliver the transfer pulse $\phi_{TR}$ which is used to transfer the signal charge from the storage gate 5 shown in FIG. 3 to the CCD shift register 7. NAND gate 47, AND gates 48 and 50, and F/F circuits 39 and 40 in combination operate to deliver an original signal $\phi'_{TR}$ for the transfer pulse $\phi_{TR}$ in synchronism with $\overline{Q}$ output from F/F circuit 32 when the charge storage is terminated while the output signal $\phi_G$ from F/F circuit 38 remains at its "H" level. Specifically, the gate 48 forms a logical product of the output S$_2$ from the gate 47, the signal $\phi_G$ and the monitor output signal MOS$_2$ to provide a signal S$_3$ which is fed to D-input terminal of F/F circuit 40. Q output of F/F circuit 40 is delivered as a signal S$_4$ to CK input of F/F circuit 39 and to OR gate 49, thus providing an original signal $\phi_{TR}'$ for the transfer pulse $\phi_{TR}$. On the other hand, a combination of AND gates 51 to 53, and F/F circuits 41, 42 is effective to deliver the original signal $\phi_{TR}'$ for the transfer pulse $\phi_{TR}$ in synchronism with the "H" level of the CCD transfer clock pulse $\phi_1$ when the charge storage is terminated after the output signal $\phi_G$ from F/F circuit 38 has changed to its "L" level. The signal $\phi_{TR}'$ is subject to a level translation in the voltage converter 54 to provide the transfer pulse $\phi_{TR}$. AND gate 52 forms a logical product of an output S$_5$ from the gate 51, and $\overline{Q}$ output from F/F circuit 39 to provide a signal S$_6$, which is fed to D-input terminal of F/F circuit 41. Q output of F/F circuit 41 is delivered as a signal S$_7$ to CK input of F/F circuit 42 and to OR gate 49, thus providing the original signal $\phi_{TR}'$ for the transfer pulse $\phi_{TR}$. In this manner, if the charge storage time is very short with respect to the transfer clock pulses $\phi_1$, $\phi_2$, it is possible to transfer the signal charge to the CCD shift register 7 at the same time as the termination of the charge storage, thus enabling the dynamic range of brightness which is amenable to photometry for purpose of focus detection to be extended. The monitor reset signal M$\phi_R$ and the overflow signal OFG are synchronized with the reset signal RS.

The operation of the focus detector constructed in the manner mentioned above will now be described with reference to FIGS. 6 and 7. FIG. 6 shows a series of timing charts which are applicable for a brief charge storage time. After this time, the signal $\phi_{TR}'$ is delivered substantially in synchronism with the termination of the charge storage. FIG. 7 shows a series of timing charts which are applicable when the charge storage time is relatively long with respect to the periods of the transfer clock pulses $\phi_1$, $\phi_2$. At this time, the signal $\phi_{TR}'$ is delivered in synchronism with the "H" level of the signal $\phi_1'$.

When the start switch 20 is turned on, CPU 13 supplies the reset signal RS to the CCD driver 11 and the amplification control circuit 10, thus setting the latter circuits to their initial conditions. The driver 11 feeds the overflow gate signal OFG in synchronism with the reset signal RS, whereby a charge in the storage of the image sensor 9 is discharged to the overflow drain OFD. The monitor reset signal M$\phi_R$ is supplied in synchronism with the reset signal RS, thus resetting the gate of FET Q$_1$ shown in FIG. 3 to its initial condition. In the amplification control circuit 10, F/F circuit 27 has $\overline{Q}$ output which assumes its "H" level under the initial condition, whereby the analog switches SW$_1$, SW$_3$ are turned on while the analog switches SW$_2$, SW$_4$ are turned off. Consequently, under the initial condition, the monitor output signal MOS$_1$ is compared within the comparator 24 to produce the monitor output signal MP4OS$_2$ while the output signal OS$_1$ from the CCD shift register 7 is converted to the output signal OS$_2$ with the amplification factor A=1. The potential of the monitor output signal MOS$_1$ decreases sequentially at a rate which depends on the light intensity incident upon the image sensor 9. Assume now that an object being photographed is under a bright illumination so that the potential of the monitor output signal MOS$_1$ becomes equal to or reduces below the output signal Vref/32 from the reference voltage generator 25 at the time when the timing signal T$_1$ developed by CPU 13 falls to its "L" level (or 3.125 ms after the initiation of the charge storage). The comparator 26 then produces an output of "L" level, and F/F circuit 27 holds and delivers the output from the comparator 26 which prevails at this point in time, thus maintaining the analog switches SW$_1$, SW$_3$ on and the analog switches SW$_2$, SW$_4$ off. Accordingly, the output signal OS$_1$ is not amplified, and is directly delivered as the output signal OS$_2$.

When an object being photographed is under a low illumination such that the monitor output signal MOS$_1$ is higher than the output voltage Vref/32 of the reference voltage generator 25 at the time when the timing signal T$_1$ falls to its "L" level, the comparator 26 produces an output of "H" level, whereby the analog switches SW$_1$, SW$_3$ are turned off while the analog switches SW$_2$, SW$_4$ are turned on. The monitor output signal MOS$_2$ is then produced as an output signal from the comparison of the monitor output signal MOS$_1$ against reference voltage Vref divided by 32, and the CCD output signal OS$_2$ is equal to the CCD output signal OS$_1$ which is amplified by a factor of 32 in the amplifier 28.

Figure 5:
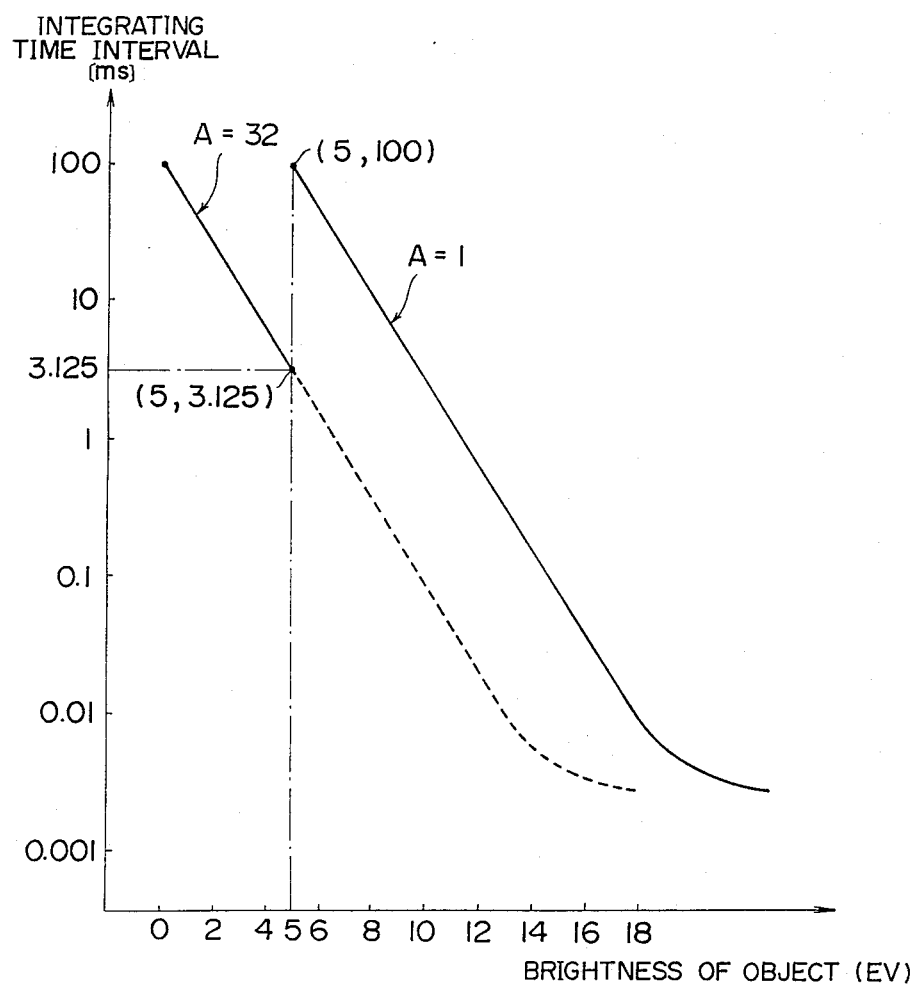
FIG. 5 is a graphical illustration of the operation of the conversion system shown in FIG. 1.

FIG. 5 graphically shows the relationship between the brightness of an object being photographed and an integrating time. It will be apparent from this Figure that the CCD output is amplified by a factor of 32 for a range of brightness from EV0 to EV5, but is not amplified for a range of brightness from EV5 to EV18. In this manner, a response to low brightness levels is enabled, and an increased dynamic range can be provided. By way of example, when an integrating time in a range from 10 μS to 100 mS is used, the determination of distance is only enabled for a range from EV5 to EV18 in the prior art since the amplification factor A is equal to 1 over the entire range. By contrast, according to the embodiment, the determination of distance is enabled for the range from EV0 to EV18. In the embodiment, the amplification factor is switched at 3.125 mS after the initiation of the charge storage, but can be freely changed at any time, even though the accuracy is improved with a greater charge storage time that can be allowed since the amplification tends to degrade S/N ratio.

When the monitor output signal MOS$_2$ changes from its "L" to its "H" level, the CCD driver 11 delivers the transfer pulse $\phi_{TR}$ to the transfer gate 5 which is used to transfer the charge in its storage to the CCD shift register 7. In the CCD image sensor 9 according to the present embodiment, a proper transfer of the signal charge cannot take place unless the transfer pulse $\phi_{TR}$ is delivered at the time when the transfer clock $\phi_1$ assumes its "H" level. The transfer clock $\phi_1$ usually has a period of several tens of microseconds, and accordingly, an attempt to achieve synchronization with the transfer clock pulse $\phi_1$ results in an increased length of charge storage time as compared with the period of the transfer clock pulse $\phi_1$ when a high speed operation is involved, producing an integration error and thus disadvantageously reducing the breadth of the dynamic range which is available on the higher brightness level. To overcome this difficulty, the transfer clock pulse $\phi_1$ is maintained at its "H" level and the transfer clock pulse $\phi_2$ is maintained at its "L" level for a given length of time greater than one period of the transfer clock pulse $\phi_1$ from the initiation of the charge storage, and the transfer pulse $\phi_{TR}$ is developed immediately upon termination of the charge storage, thus minimizing the integration error. Where a long charge storage time is used, the transfer pulse $\phi_{TR}$ is delivered in synchronism with the "H" level of the transfer clock pulse $\phi_1$. This presents no problem since then the magnitude of any integration error is small in relation to the charge storage time.

When the signal charge is transferred to the CCD shift register 7 in response to the transfer pulse $\phi_{TR}$, it is sequentially transferred by the transfer clock pulses $\phi_1$ and $\phi_2$ before it is used to control the amplification factor of the control circuit 10, whereupon it is converted into a digital value by the converter 12. The resulting digital data is stored in CPU 13 for use in a desired calculation to determine the distance to an object being photographed. When used in a focus detector of phase difference type as in the present embodiment, a phase difference between the distributions of illuminance of a pair of images which are focussed upon the CCD image sensor 9 by the two lenses L$_1$, L$_2$ is calculated, and a lens movement which is required to reach an in-focus point is determined on the basis of the result of the calculation and using a conversion coefficient which is stored in lens ROM 14. As the lens is driven by means of the lens drive circuit 15 and the motor 21, an array of slits 17 which are formed at an equal interval in a rotatable member of the lens barrel rotates, causing the photointerrupter comprising the diode 18 and the phototransistor 19 to count the number of slits 17 which have passed therebetween. The lens drive is interrupted when the count of slits reaches a given relationship with the result of calculation. At this time, an in-focus or out-of-focus signal is delivered to the display 16.

Figure 8:
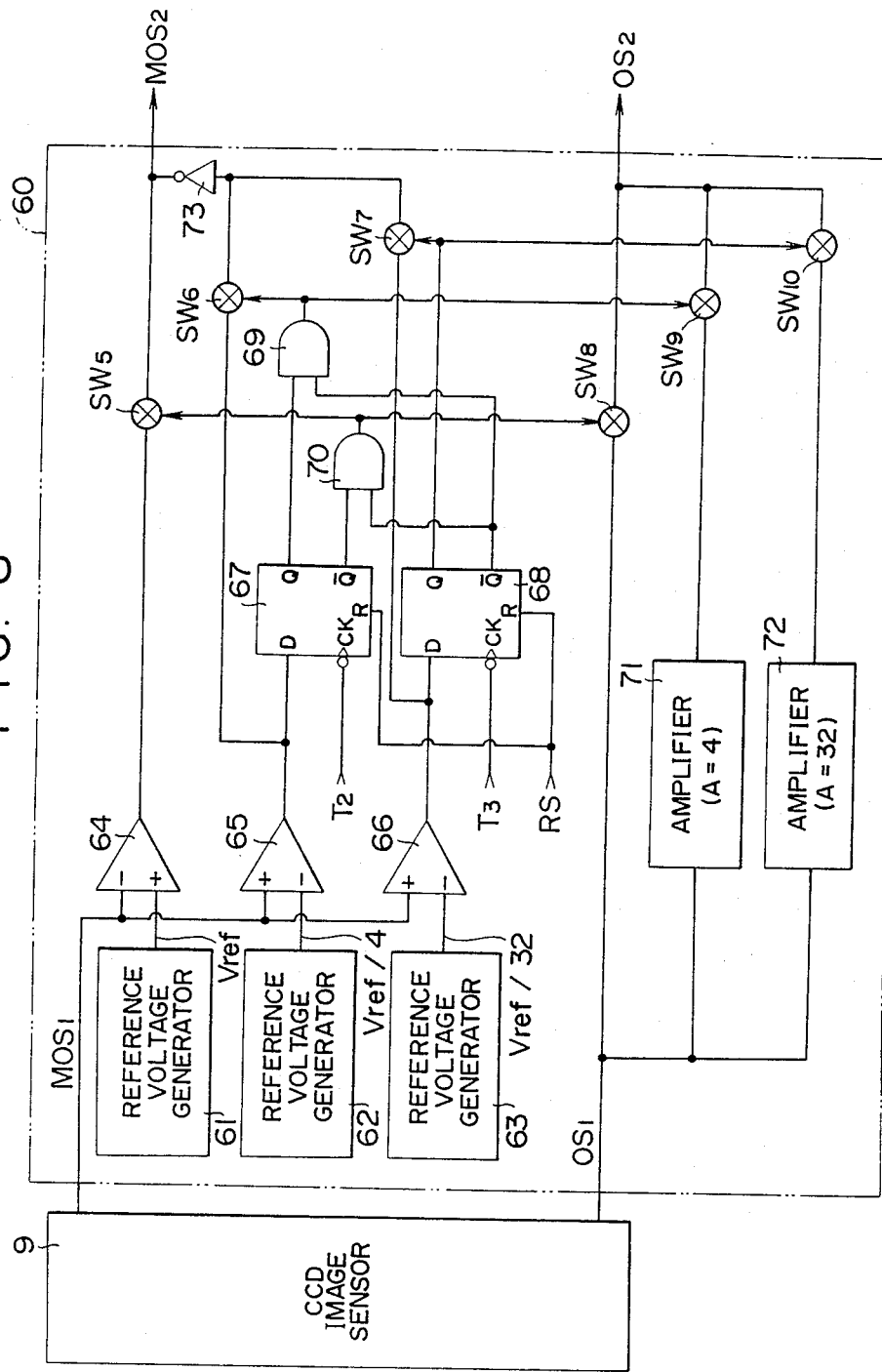
FIG. 8 is a circuit diagram of a photoelectric conversion apparatus for focus detection according to another embodiment of the invention.

In the focus detector described above, the amplification control circuit 10 shown in FIG. 1 may be replaced by an amplification control circuit 60 shown in FIG. 8 which is arranged to switch the amplification factor over a number of steps. A plurality of reference voltage generators 61 to 63 deliver a reference voltage Vref, a reference voltage Vref/4 and a reference voltage Vref/32, respectively. The reference voltage Vref is applied to the non-inverting input terminal of a comparator 64, the reference voltage Vref/4 is applied to the inverting input terminal of a comparator 65, and a reference voltage Vref/32 is applied to the inverting input terminal of a comparator 66. The monitor output signal MOS$_1$ from the CCD image sensor 9 is applied to the inverting input terminal of the comparator 64 and to the non-inverting input terminals of the comparators 65 and 66. The output terminal of the comparator 64 is connected to the input terminal of an analog switch SW$_5$, the output terminal of the comparator 65 is connected to the input terminal of an analog switch SW$_6$ and to D-input terminal of F/F circuit 67, and the output terminal of the comparator 66 is connected to the input terminal of an analog switch SW$_7$ and to D-input terminal of F/F circuit 68. A timing signal T$_2$ is inverted to its "L" level at 0.195 mS after the initiation of the charge storage, and a timing signal T$_3$ is inverted to its "L" level at 3.125 mS after the initiation of the charge storage, both timing signals being controlled by CPU 13. F/F circuit 67 has Q output which is fed to one input of AND gate 69 and also has $\overline{Q}$ output which is fed to one input of AND gate 70.

F/F circuit 68 has $\overline{Q}$ output which is fed to the other input of the gates 69, 70. The output of the gate 70 controls the analog switches SW$_5$, SW$_8$ while the output of the gate 69 controls the analog switches SW$_6$, SW$_9$. F/F circuit 68 has Q output which controls the analog switches SW$_7$, SW$_{10}$. The output terminals of the analog switches SW$_6$ and SW$_7$ are connected to the input terminal of an inverter 73. The output terminal of the inverter 73 and the output terminal of the analog switch SW$_5$ are connected together to deliver the monitor output signal MOS$_2$ to the CCD driver 11. The CCD output signal $OS_1$ from the image sensor 9 is fed to the input terminal of the analog switch $SW_8$ and to the respective input terminals of a pair of amplifiers 71 and 72 having amplification factors A=4, and A=32, respectively. The output terminals of the amplifiers 71, 72 are connected to the input terminals of the analog switches $SW_9$ and $SW_{10}$, respectively. The output terminals of the analog switches $SW_8$, $SW_9$ and $SW_{10}$ are connected together to deliver the CCD output signal $OS_2$ to the converter 12.

In operation, after the initiation of the charge storage, the monitor output signal MOS has a potential which decreases at a rate dependent on the brightness of the light. Initially, F/F circuits 67 and 68 have Q outputs of "L" level while their $\overline{Q}$ outputs are at "H" level. Accordingly, only the analog switches $SW_5$ and $SW_8$ are turned on while the remaining analog switches are turned off. Hence, the CCD output signal $OS_1$ is directly delivered as the output signal $OS_2$ since the amplification factor A is equal to 1. at t=0.195 mS after the initiation of the charge storage when the timing signal $T_2$ changes from its "H" to its "L" level, the signal applied to the D-input terminal of F/F circuit 67 is directly delivered from its Q output terminal, which is then maintained. If the monitor output signal $MOS_1$ has a potential greater than Vref/4 at t=0.195 mS, this means that an object being photographed is under a low illumination and the comparator 65 produces an output of "H" level. Thus, the gate 67 produces an output of "L" level, the gate 69 produces an output of "H" level, and F/F circuit 68 has Q output of "L" level, whereby only the analog switches $SW_6$ and $SW_9$ are turned on while the remaining analog switches are turned off. Accordingly, the CCD output $OS_11$ is amplified with an amplification A of 4 by the amplifier 71.

At t=3.125 mS after the initiation of the charge storage, the timing signal $T_3$ changes from its "H" to its "L" level. If the monitor output signal MOS has a potential greater than Vref/32 at this time, this means that an object being photographed is under a further reduced illumination. The comparator 66 then produces an output of "H" level, and F/F circuit 68 maintains this level which prevails at t=3.125 mS, which is delivered from its Q output terminal. $\overline{Q}$ output terminal maintains its "L" level, whereby the gates 69 and 70 produce outputs of "L" level. This allows only the analog switches $SW_7$ and $SW_{10}$ to be turned on while the remaining analog switches remain off. Accordingly, the CCD output signal $OS_1$ is amplified with an amplification factor A of 32 by the amplifier 72 to be delivered as the CCD output signal $OS_2$.

Figure 9:
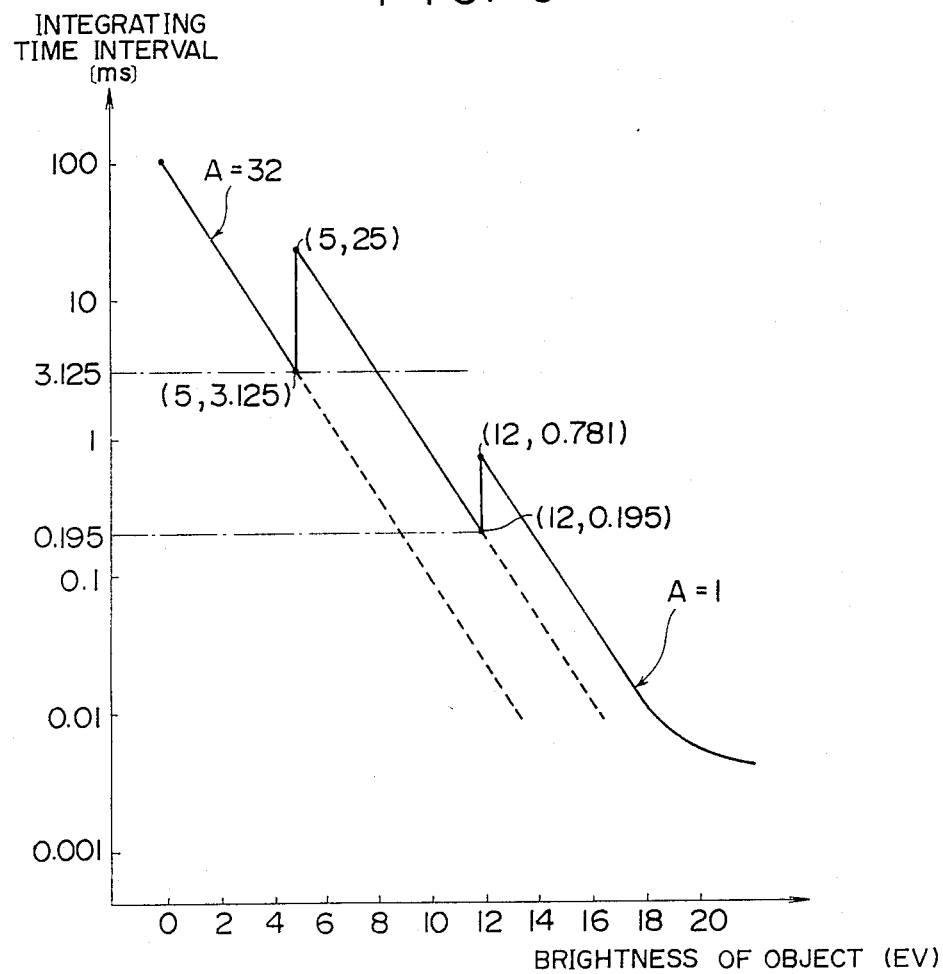
FIG. 9 graphically illustrates the operation of the conversion apparatus shown in FIG. 8.

FIG. 9 graphically shows the relationship between the brightness and the integrating time which is obtained by the circuit arrangement of FIG. 8. It will be seen from the comparison of FIGS. 5 and 9 that the integrating time for the medium range of brightness (EV5 to EV12) can be reduced as compared with the embodiment of FIG. 1.

In the described embodiments, the charge storage time is controlled by an amount of charge developed by a monitor photoelectric transducer element which is disposed adjacent to an array of photoelectric transducers used to detect a distribution of light intensity of an object being photographed. However, as an alternative, the charge storage time can also be controlled by detecting a storage time of the photoelectric transducer element by the floating gate, and detecting a change which occurs in the potential of the floating gate. It will be apparent that the invention is readily applicable to such control.

Figure 10:
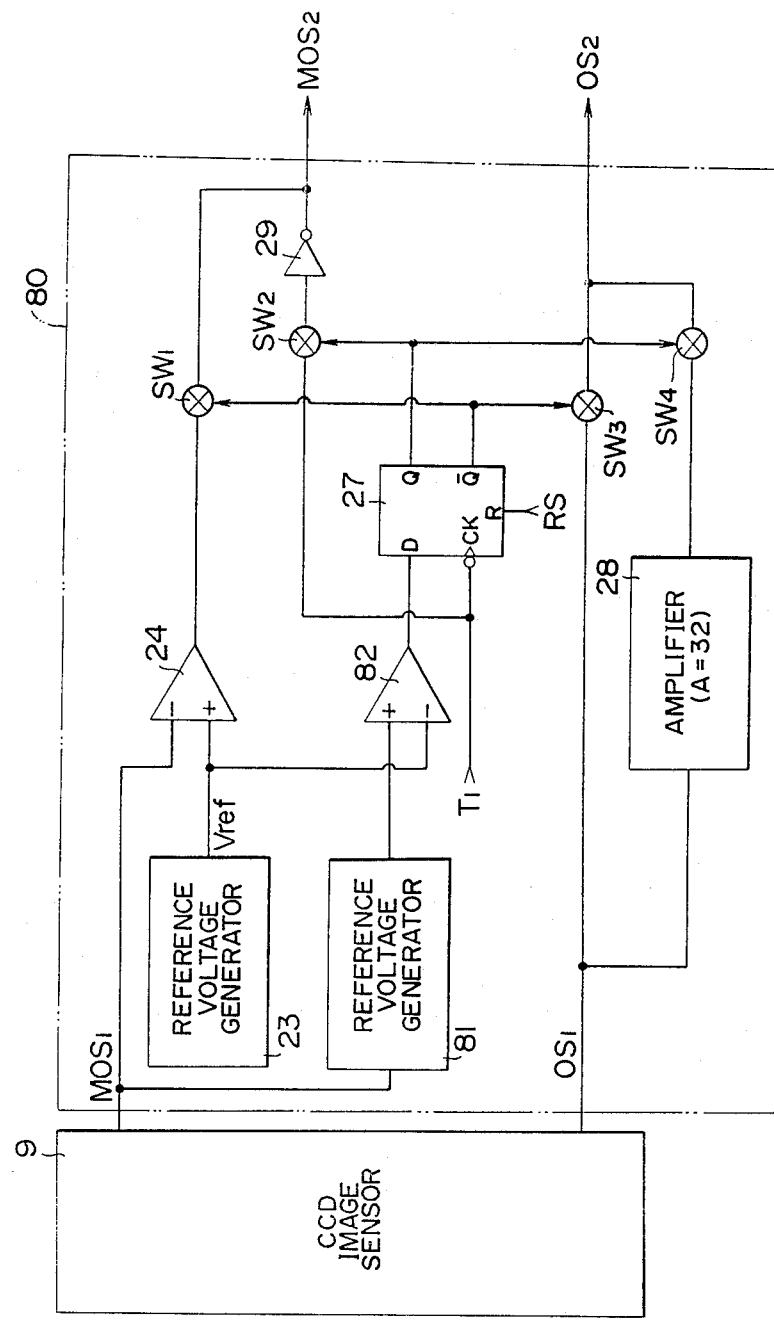
FIG. 10 is a circuit diagram of a photoelectric conversion apparatus for focus detection according to a further embodiment of the invention.

FIG. 10 shows a further embodiment of amplification control circuit 80 which functions in entirely the same manner as the amplification control circuit 10 shown in FIG. 1. In the control circuit 10, the output signal $MOS_1$ from the image sensor 9 is compared against Vref/32 at a time interval corresponding to the timing signal $T_1$ after the initiation of the integration. However, in the amplification control circuit 80, the monitor output signal $MOS_1$ is amplified by an amplification factor of 32 by an amplifier 81 before it is fed to the non-inverting input terminal of a comparator 82, the inverting input terminal of which is fed with a reference voltage Vref which is produced by the reference voltage generator 23. In other respects, the arrangement is similar to the previous embodiment. The output terminal of the comparator 82 is connected to D-input terminal of F/F circuit 27 and to the input terminal of the analog switch $SW_2$ in the same manner as the comparator 26. Stated differently, the amplification control circuit 80 functions in the same manner as FIG. 1 except that the monitor output signal $MOS_1$ is amplified by a factor of 32 for comparison against the reference voltage Vref rather than Vref/32 for purpose of level comparison.

What is claimed is:

1. A photoelectric conversion apparatus for focus detection comprising
   photoelectric transducer elements each for developing a charge in accordance with a distribution of light reflected from an object upon said elements;
   monitor means for producing an output which corresponds to a stored amount of charge developed by the photoelectric transducer elements;
   amplifier means for amplifying an output from the photoelectric transducer elements;
   first comparator means for comparing the output from the monitor means against a first reference level at a first given time interval after the initiation of the charge storage;
   output switching means operative to derive an output from the photoelectric transducer elements directly as a focus detection output when the output from the monitor means reaches the reference level and operative to derive an output from the amplifier means as a focus detection output when the output from the monitor means does not reach the reference level, by passing an output from the photoelectric transducer elements to the amplifier after the first time interval;
   and storage interrupt signal switching means operative to derive an output from second comparator means for comparing the monitor means output against a second reference level, said second reference level being higher than said first level, said second comparator means output being employed as a storage interrupt signal for the photoelectric transducer elements when the output from the monitor means reaches the second reference level and to derive an output from the first comparator means as the storage interrupt signal when the output from the monitor means does not reach the second reference level.

2. A photoelectric conversion apparatus according to claim 1 in which the first comparator means comprises a comparator circuit which compares an output voltage from the monitor means against a reference voltage which is substantially inversely proportional to the amplification factor of the amplifier means.

3. A photoelectric conversion apparatus according to claim 1 in which the first comparator means comprises a comparator circuit which compares an output voltage from the monitor means as amplified by an amplification factor which is substantially proportional to the amplification factor of the amplifier means against the reference voltage.

4. A photoelectric conversion apparatus according to claim 1 wherein the condition of said monitor means output being compared is a voltage level and said first and second reference levels are predetermined voltage levels.

5. A photoelectric conversion apparatus according to claim 4 wherein said first comparator means has one input coupled to said monitor means for deriving a voltage signal output therefrom.

6. A photoelectric conversion apparatus according to claim 4 wherein said first comparator means has one input for receiving the voltage to be compared with said first reference voltage; and
  means responsive to the monitor means output means for producing a voltage related to the output voltage of said monitor means for performing a comparison operation.

7. A photoelectric conversion apparatus for focus detection comprising
  photoelectric transducer elements each for producing a charge in accordance with a distribution of light brightness of an object being photographed;
  monitor means for producing a voltage which corresponds to an accumulation of charge produced by the photoelectric transducer elements;
  amplifier means for amplifying an output from the photoelectric transducer elements;
  comparator means for comparing an output voltage from the monitor means against a first reference voltage at a first given time interval after the initiation of a charge storage;
  and switching means operative to choose a second reference voltage for determination of termination of a charge storage when an output voltage from the monitor means exceeds the first reference voltage to allow the output of the photoelectric transducer element to be used in the focus detection and operative to choose the first reference voltage for the determination of termination of the charge storage when an output voltage from the monitor means does not exceed the first reference voltage to allow an output from the photoelectric transducer elements as amplified by the amplifier means to be used in the focus detection.

8. A photoelectric conversion apparatus for focus detection comprising
  photoelectric transducer elements each for producing a charge in accordance with a distribution of light brightness of an object being photographed;
  monitor means for producing a voltage which corresponds to a stored amount of charge produced by the photoelectric transducer elements;
  amplifier means for amplifying an output from the photoelectric transducer element;
  comparator means for comparing an output voltage from the monitor means as amplified against a reference voltage at a given first time interval after the initiation of the charge storage;
  a common output terminal;
  and switching means for terminating the charge storage when an output voltage from the monitor means exceeds the reference voltage to couple only the output from the photoelectric transducer elements to the common output terminal for use in a focus detection operation if the comparator means indicates that the amplified monitor voltage exceeds the reference voltage and for terminating the charge storage when the amplified monitor voltage exceeds the reference voltage to couple only the output from the amplifier means to said common output terminal if the amplified monitor voltage does not exceed the reference voltage.

9. A focus detector comprising
  a plurality of photoelectric transducer elements each for producing a charge in accordance with a distribution of light brightness reflected from an object being photographed;
  monitor means for producing a voltage corresponding to a stored amount of charge produced by the photoelectric transducer elements;
  first comparator means for comparing an output from the monitor means against a first reference value at a first given time interval after the initiation of the charge storage;
  integration interrupting means for terminating the integration of an output from the photoelectric transducer elements on the basis of second comparator means for comparing said monitor means output against a second reference level which is greater than said first reference level if the first comparator means indicates that an output from the monitor means exceeds the level of the first reference value and on the basis of third comparator means for comparing said monitor means output against a third reference level which is less than said first reference level if an output from the monitor means does not exceed the level of the reference value;
  and focus detecting means for performing a focus detection on the basis of an output from the photoelectric transducer elements after the interruption of the integration.

10. A focus detector according to claim 9, further including amplifier means for amplifying an output from the photoelectric transducer elements when the integration is terminated on the basis of the third comparator means.

11. A focus detector according to claim 10 in which the first comparator means also operates as the third comparator means.

12. A photoelectric conversion apparatus according to claim 9 wherein said integration interrupting means further comprises means selectively responsive to one of said comparator means for terminating the integration of an output from the photoelectric transducer elements.

13. A focus detecting method comprising the steps of
  receiving light from an object being photographed on photoelectric transducer elements to store a charge in accordance with a distribution of light brightness of the object being photographed;
  initiating the storage of an output from a monitor photoelectric transducer element which is disposed adjacent to the first mentioned photoelectric transducer elements at the same time as the initiation of the first mentioned storage;

comparing an output from the monitor transducer element against a given value at a given time interval after the initiation of the storage;

choosing a decision level which is used to terminate the storage depending on the result of the comparison;

and determining an amplification factor for the storage output from the photoelectric transducer element as it is read upon termination of the storage.

14. A focus detecting method according to claim 13 in which the step of choosing a decision level comprises choosing a higher decision level when a result of the comparison indicates a high level of charge storage.

15. A focus detecting method according to claim 13 in which the step of amplifying including choosing a greater amplification factor when a result of the comparison indicates a low level of charge storage.

16. A photoelectric conversion apparatus for focus detection comprising photoelectric transducer elements each for developing a charge in accordance with a distribution of light brightness of an object being photographed;

monitor means for producing a voltage which corresponds to a stored amount of charge developed by the photoelectric transducer elements;

amplifier means for amplifying an output from the photoelectric transducer elements;

first comparator means for comparing an output voltage from the monitor means against a reference voltage at a first given time interval after the initiation of the charge storage;

output switching means operative to derive an output from the photoelectric transducer elements directly as a focus detection output when the output voltage from the monitor means reaches the reference voltage and operative to derive an output from the amplifier means as a focus detection output when the output voltage from the monitor means does not reach the reference voltage, by passing an output from the photoelectric transducer elements to the amplifier after the first time interval;

and storage interrupt signal switching means operative to derive an output from second comparator means for comparing the monitor means output voltage with a second reference voltage which is higher than said first reference voltage, said second comparator means output serving as a storage interrupt signal for the photoelectric transducer elements when the output voltage from the monitor means reaches said first reference voltage and to derive an output from the first comparator means as the storage interrupt signal when the output voltage from the monitor means does not reach said first reference voltage.

17. A photoelectric conversion apparatus for focus detection comprising photoelectric transducer elements each for developing a charge in accordance with a distribution of light brightness of an object being photographed;

monitor means for producing a voltage which corresponds to a stored amount of charge developed by the photoelectric transducer elements;

amplifier means for amplifying an output from the photoelectric transducer elements;

first comparator means for comparing a voltage which is related to the output voltage from the monitor means against a reference voltage at a first given time interval after the initiation of the charge storage;

output switching means operative to derive an output from the photoelectric transducer elements directly as a focus detection output when said related voltage reaches said first reference voltage and operative to derive an output from the amplifier means as a focus detection output when said related voltage does not reach said first reference voltage, by passing an output from the photoelectric transducer elements to the amplifier after the first time interval;

and storage interrupt signal switching means operative to derive an output from second comparator means for comparing said related voltage with a second reference voltage higher than said first reference voltage, said second comparator means output serving as a storage interrupt signal for the photoelectric transducer elements when said related voltage reaches said first reference voltage and to derive an output from the first comparator means as the storage interrupt signal when said related voltage does not reach said first reference voltage.

18. A method for controlling the photoelectric transducer elements of a focus detector comprising the steps of:

initiating a focus detection operation by enabling said elements to develop a charge in accordance with a distribution of light brightness reflected from an object;

developing a voltage corresponding to a stored amount of charge produced by said elements;

providing a common output terminal;

selectively coupling the output from said elements directly to said common output terminal if said developed voltage reaches a first predetermined reference voltage a predetermined time interval after initiation of a focus detection operation;

amplifying the output from said elements;

selectively coupling said amplified output to said common terminal if said developed voltage fails to reach said first predetermined reference level upon termination of said predetermined time interval; and terminating charging of said elements when said voltage reaches a second predetermined reference level.

19. The method of claim 18 further comprising the step of developing a voltage related to said voltage for comparison with said first reference level.

20. The method of claim 18 wherein said second reference level is lower than said first reference level.

21. The method of claim 18 wherein said second reference level is higher than said first reference level.

22. A method for controlling the photoelectric transducer elements of a focus detector comprising the steps of:

initiating a focus detection operation by enabling said elements to develop a charge in accordance with a distribution of light brightness reflected from an object;

developing a voltage corresponding to a stored amount of charge produced by said elements;

providing a common output terminal;

selectively coupling the output from said elements directly to said common output terminal if said developed voltage reaches a first predetermined reference voltage a predetermined time interval after initiation of a focus detection operation;
amplifying the output from said elements by a first predetermined value;
selectively coupling said amplified output to said common terminal if said developed voltage fails to reach said first predetermined reference level upon termination of said predetermined time interval;
amplifying the output from said elements to a second predetermined value;
selectively coupling the first-mentioned amplified output to said common terminal if said developed voltage reaches said second predetermined level a second predetermined time interval after intiation of a focus detection operation;
selectively coupling the last-mentioned amplified output to said common terminal if said developed voltage fails to reach a third predetermined reference level upon termination of said second predetermined time interval.

23. The method of claim 21 further comprising the step of terminating charging of said elements when said third voltage reaches said second predetermined level when said voltage exceeds said first predetermined level at said first predetermined time interval.

* * * * *

UNITED STATES PATENT AND TRADEMARK OFFICE
CERTIFICATE OF CORRECTION

PATENT NO. : 4,870,441
DATED : September 26, 1989
INVENTOR(S) : Masafumi Yamasaki It is certified that error appears in the above-identified patent and that said Letters Patent is hereby corrected as shown below:

Column 4, line 16, "$Q_9$ to $Q_7$" should be
-- $Q_6$ to $Q_9$ --

Column 6, line 51, "MP4OS$_2$" should be --MOS$_2$--

Column 7, line 27, "EV18" should be --EV8--

Signed and Sealed this

Tenth Day of September, 1991

Attest:

HARRY F. MANBECK, JR.

*Attesting Officer*     *Commissioner of Patents and Trademarks*